United States Patent [19]

Peel et al.

[11] Patent Number: 4,961,360
[45] Date of Patent: Oct. 9, 1990

[54] BLOCK CUTTING GUIDE

[76] Inventors: Robert C. Peel, 210 ½ E. Lake St., Mt. Shasta, Calif. 96067; Donald L. Troxell, 107 - 6th Ave., Dunsmuir, Calif. 96025

[21] Appl. No.: 250,519
[22] Filed: Sep. 29, 1988
[51] Int. Cl.5 .............................................. B27B 9/04
[52] U.S. Cl. ...................................... 83/745; 83/455; 83/522.26; 83/614; 83/829; 83/574
[58] Field of Search ................ 83/745, 743, 614, 455, 83/821, 829, 574, 522.26, 468.1, 468.7; 33/474, 479, 480, 481

[56] References Cited

U.S. PATENT DOCUMENTS

| | | | |
|---|---|---|---|
| 208,104 | 9/1878 | Kurtz | 33/474 X |
| 343,616 | 6/1886 | Upson et al. | 33/474 |
| 373,929 | 11/1887 | Gillette | 33/474 |
| 2,246,260 | 6/1941 | McGrath | 33/480 |
| 2,735,455 | 2/1956 | Forsberg | 83/745 |
| 2,773,523 | 12/1956 | Hopla | 83/745 |
| 3,124,176 | 3/1964 | Vogini | 83/745 X |
| 3,623,232 | 11/1971 | Mahlstadt | 33/474 |
| 4,128,030 | 12/1978 | Kundikoff | 83/745 |
| 4,494,434 | 2/1985 | Young | 83/745 |
| 4,608,898 | 9/1986 | Volk | 83/745 |
| 4,608,902 | 9/1986 | Ivey | 83/745 X |
| 4,638,564 | 1/1987 | Burrows | 83/745 X |

Primary Examiner—Douglas D. Watts
Assistant Examiner—Rinaldi Rada

[57] ABSTRACT

A carpenter's tool expedites the cutting of lengthy boards into shorter segments of uniform length with a hand held power saw or the like. The angled tool has a linear board guide member that is abutted against a side of the board and a saw guide member which extends across the board and defines a surface along which the saw may be traveled. A stop member extends from the board guide member for abutment against the end of the board to to fix the length of the segments which are cut from the board, the position of the stop member along the board guide member preferably being adjustable. The hand of the operator which grasps the board guide member during a cutting operation is held at a location away from the saw by a thumb grip which extends between the operator's thumb and forefinger. The tool may also be provided with rulings for measuring distances in a building framework or the like that are to be spanned by the board segments.

7 Claims, 2 Drawing Sheets

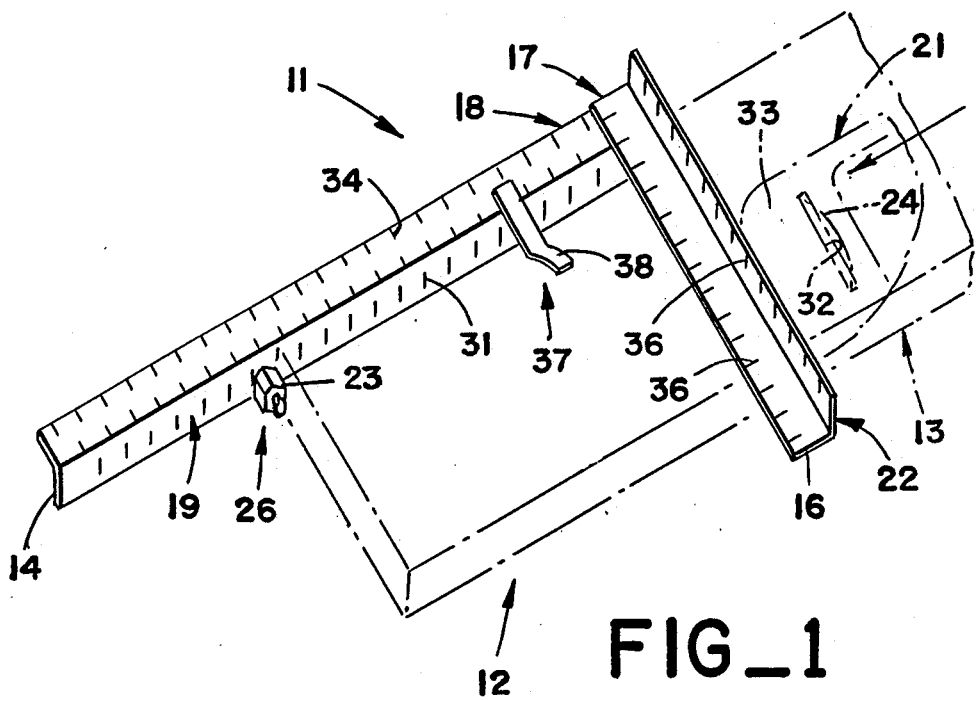
FIG_1
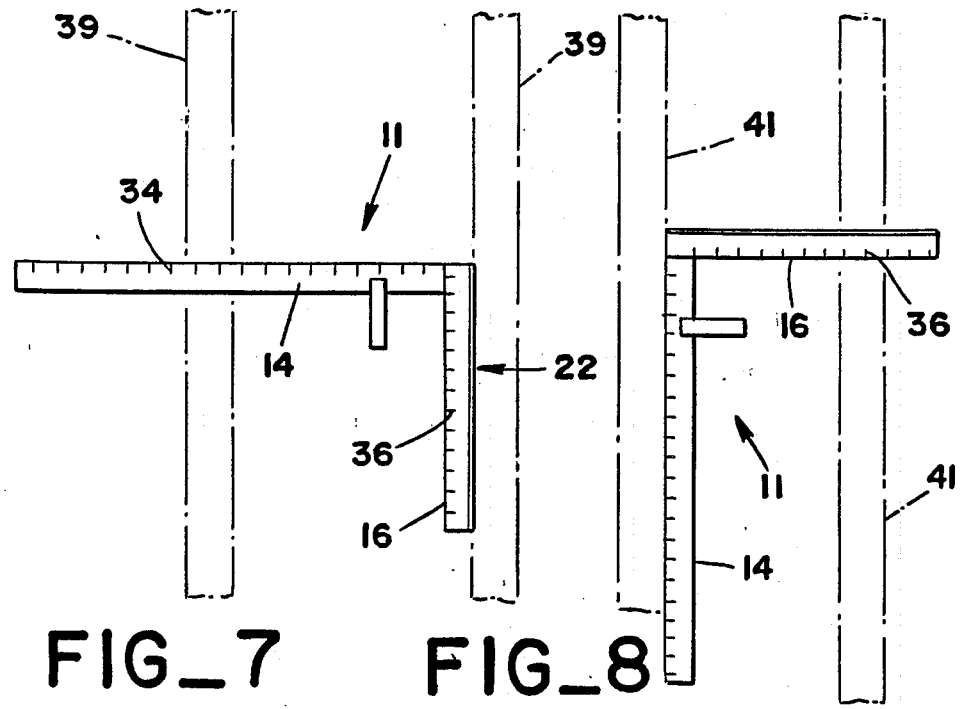
FIG_7  FIG_8

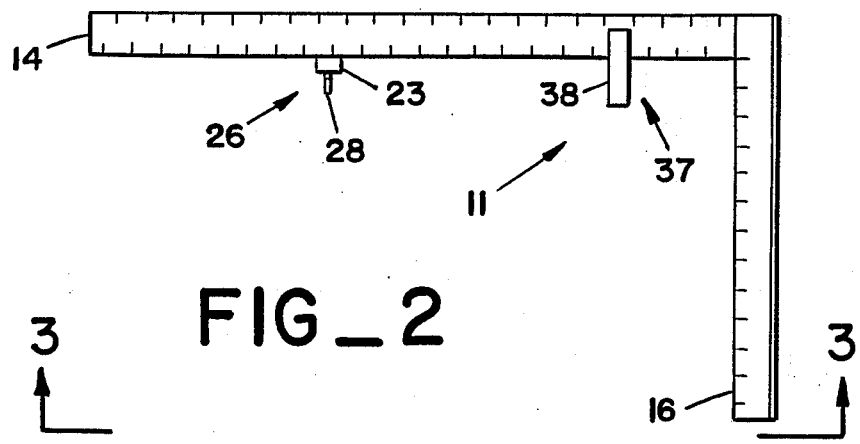
FIG_2
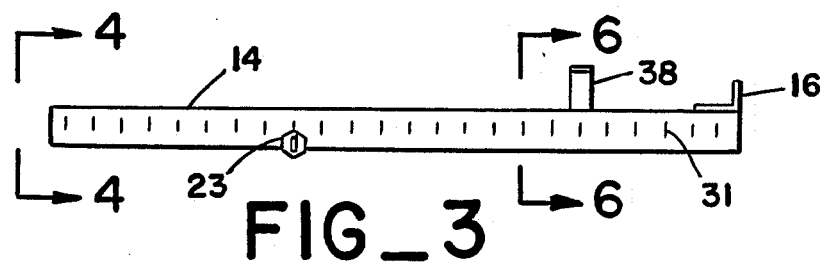
FIG_3
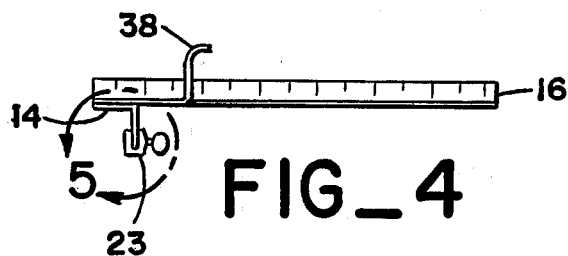
FIG_4
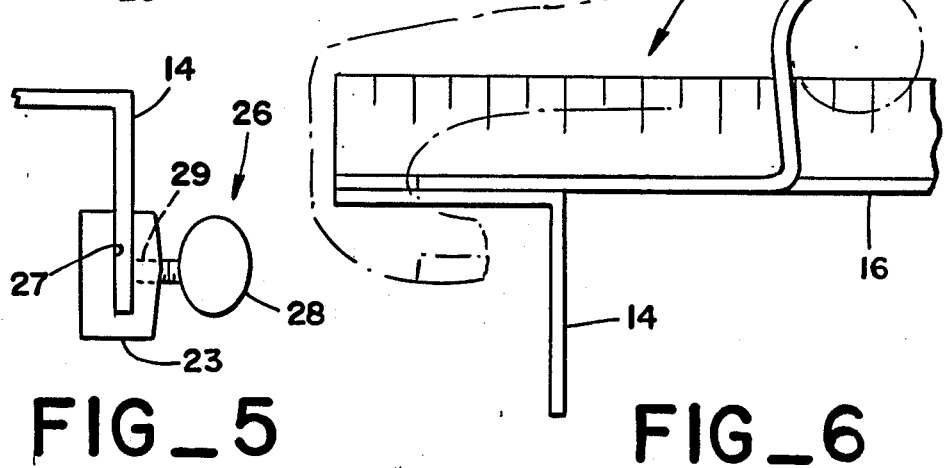
FIG_5          FIG_6

BLOCK CUTTING GUIDE

TECHNICAL FIELD

This invention relates to carpenters tools and more particularly to a hand held saw guide which facilitates cutting of boards of lumber or other construction material into shorter segments.

BACKGROUND OF THE INVENTION

Lumber or other sawable material for use in the construction of buildings or for other purposes is typically delivered to the construction site in the form of long boards of standardized length. The structure typically requires large numbers of shorter board segments or blocks of some particular length. Short blocks of this kind are needed, for example, in the framing of floors and ceilings and for use as studs.

Sawing of boards into shorter blocks of a predetermined length is one of the major time consuming and cost generating operations at most construction sites. It has heretofore been assumed that the most efficient way to accomplish this operation is to make use of a powered radial arm saw which is brought to the site. A radial arm saw is large and heavy and thus transporting the saw to the site moving it about if necessary and then removing it from the site is itself a somewhat difficult operation. It is also stationary during use. Thus the boards which are to be cut must be carried to the location of the saw and the operator must repetitively shift a lengthy board into a new position on the saw between each cutting operation.

It would be advantageous if block cutting could be accomplished efficiently and with precision with a lighter, more portable hand held saw that can be easily carried to the site and which can be moved about as necessary instead of moving heavy boards to a fixed saw location. It would also be more efficient if the operator is not required to shift a heavy board between each cutting operation.

Substantial preliminary effort has heretofore been required to measure the length to which blocks are to be cut and then to set up the radial arm saw for cutting that particular length. Simplification of the set up procedures would also be advantageous.

The background of the invention has been discussed above with respect to problems encountered at building construction sites or the like. Similar problems are involved in various non-professional operations where boards are to be cut into shorter segments. Persons undertaking to make home repairs, for example, often need to cut boards into shorter lengths. Use of a measuring tape and then a carpenters square and pencil to draw cut lines and repetitive shifting and re-clamping of the board in a vise or the like is a slow and tedious operation. There is also usually an undesirable lack of precision in the length of blocks cut by such methods, particularly if a hand held saw is used.

The present invention is directed to overcoming one or more of the problems discussed above.

SUMMARY OF THE INVENTION

In one aspect, the present invention provides a block cutting guide for facilitating the sawing of a board of lumber or the like into segments of predetermined length. The device includes a board guide member having a flat first surface for abutment against a side surface of the board or the like. A saw guide member is secured to the board guide member in angled relationship to the latter and extends across the board when the first surface is abutted against the side of the board. The saw guide member has a flat second surface against which a saw may be abutted for travel along the second surface during the cutting operation. A stop member extends outward from the first surface in position for abutment against an end of the board and thus determines the length of the block produced by the cutting operation.

In another aspect, the invention includes means for selectively changing the location of the stop member along the first surface.

In another aspect of the invention, means are provided for defining a predetermined location along the board guide member at which it is to be gripped by an operators hand, the location being spaced from the second surface a distance sufficient to situate the operators hand away from the saw.

In still another aspect of the invention, the board guide member has spaced apart indicia which are indicative of predetermined distances from the cutting blade of a saw that is abutted against the second surface. In a further aspect, the saw guide member has indicia identifying successive distances from one end of the member thereby enabling use of the device for determining the lengths to which blocks must be cut in order to extend between frame members of a building or the like.

In another aspect of the invention, a block cutting guide for facilitating the sawing of a board of lumber or other material into segments of predetermined length includes a board guide angle member having a flat board contacting surface for disposition against a side of the board. A saw guide angle member extends at right angles from one end of the board guide angle member and has a flat saw contacting surface oriented at right angles to both the board contacting surface and the face of the board when the board contacting surface is abutted against the side of the board. A stop member is engaged on the board guide angle member and extends from the board contacting surface in position to abut an end of the board, the stop member being slidable along the board guide angle member. Means are provided for selectively clamping the stop member to the board guide angle member at any selected one of a plurality of locations along the member.

The invention greatly simplifies and expedites the cutting of short blocks from relatively lengthy boards by making it practical to use a hand held saw, preferably of the powered type, for the purpose. The block cutting guide is simply emplaced on the end of the board which is to be cut and held in position by one hand of the operator while the other hand travels the saw along the guide to cut a block having a precise length predetermined by the setting of the stop member of the guide. The operator need not reposition a lengthy board between each cut as the relatively light guide itself is easily moved to the location of the new end of the board following each cut. The block cutting guide and hand holdable saw can be carried to a work site and moved about at the site much more easily than in the case of the radial arm saws presently used for similar purposes. Comparative tests have shown that the invention realizes a substantially greater rate of production of blocks than is accomplished with a radial arm saw. In the preferred form, the block cutting guide can be used for further purposes such as making precisely right angled cuts across any selected location on a board or for quickly measuring the width of spaces within a framework that are to be spanned by blocks.

BRIEF DESCRIPTION OF THE DRAWINGS

FIG. 1 is a perspective view of a block cutting guide in accordance with a preferred embodiment of the invention shown positioned on a board from which a block of predetermined length is to be cut.

FIG. 2 is a top view of the block cutting guide when it is horizontally oriented as is usually the case during operation.

FIG. 3 is a side view of the block cutting guide taken along line 3—3 of FIG. 2.

FIG. 4 is an end view of the block cutting guide taken along line 4—4 of FIG. 3.

FIG. 5 is an enlarged view of the area of FIG. 4 which is encircled by dashed line 5 thereof.

FIG. 6 is an enlarged cross section view taken along line 6—6 of FIG. 3 and illustrating the position of one of the operator's hands during use of the block cutting guide.

FIG. 7 is a view illustrating usage of the block cutting guide for measuring the width of gaps which are to be spanned by blocks in order to facilitate setting of the guide to produce blocks of appropriate length.

FIG. B is a view illustrating a modified orientation of the block cutting guide for the purpose of measuring gaps that may be more convenient under certain conditions.

DETAILED DESCRIPTION OF THE PREFERRED EMBODIMENT

Referring initially to FIG. 1 of the drawings, a block cutting guide 11 in accordance with this embodiment of the invention is designed to be fitted against an end portion 12 of a board 13 of lumber or other sawable material to facilitating cutting of the end portion from the board to produce a shorter block of predetermined length.

The block cutting guide 11 has a linear board guide member 14 and a linear saw guide member 16 which are oriented at right angles to each other in this embodiment. One end 17 of the saw guide member 16 overlies one end 18 of the board guide member 14 and the two members are secured together at such ends by welding in this example although bolts, rivets, adhesives or other securing means may also be used.

Board guide member 14 has a flat first or board contacting surface 19 for abutment against one side of the board end portion 12 during a cutting operation. Saw guide member 16 extends across the face of the board 13, at right angles to the long dimension of the board, when the board guide member 14 is positioned in that manner. The saw 21 may then be abutted against a flat second or saw contacting surface 22 on saw guide member 16 which surface extends at right angles to both the board contacting surface 19 and the face of the board 13 itself. The saw 21 is then traveled along the surface 22 to provide a precisely located and precisely oriented transverse cut across the board.

The length of the block or end portion 12 which is cut from board 13 is fixed by a stop member 23 which extends outward a distance from the board contacting surface 19 and which is abutted against the end of the board portion 12 prior to the cutting operation. The stop member 23 is located at a position along the board guide member 14 that is spaced from the location of the cutting element 24 of saw 21 a distance corresponding to the desired length of the blocks that are to be cut from the board 13. Means 26 are provided for selectively changing the location of the stop member 23 along the board contacting surface 19 to enable cutting of blocks having different predetermined lengths, which means will hereinafter be described in more detail.

The board guide member 14 and saw guide member 16 may have any of various cross sectional configurations but, with reference jointly to FIGS. 2, 3 and 4, it is advantageous if each is an angle member of L-shaped cross section. Such a construction provides high strength and rigidity with minimized weight and bulk.

Referring to FIG. 5, the stop member 23 of this embodiment is slidable along the board guide member 14 and for this purpose has a slot 27 into which a portion of the board guide member extends. The means 26 for selectively changing the location of the stop member 23 includes a thumbscrew 28 engaged in a threaded bore 29 in the stop member which bore communicates with the slot. Thus the stop member 23 may be moved to the desired location along the board guide member 14 and then be fixed at that position by turning the thumbscrew 28 to clamp the stop to the board guide member.

With reference again to FIG. 1, positioning of the stop member 23 to cut blocks 12 of the desired length is facilitated by a first set 31 of indicia or spaced apart markings on board guide member 14 which indicate successive distances from the location of the cutting element 24 of the saw 21 when the saw is abutted against saw contacting surface 22. Motor operated hand held circular saws 21 of the type which is used with the present embodiment of the invention have a disc shaped cutting element 24 which extends through a slot 32 in a plate 33 that contacts the board 13 during a cutting operation. The distance of the cutting element 24 from the side edge of plate 33 is standardized in the industry and is one and one half inches in the United States of America at the present time. Thus the indicia 31 are not, in this example, located to identify distances from the end of board guide member 14 but instead identify distances from a point one and half inches outward from the end of the board guide member. This offset may be different in countries where different units are used to measure distances and/or where saws 21 are manufactured with a different spacing between the cutting element 24 and the edge of plate 33.

A second series 34 of indicia may be provided along the length of board guide member 14 to facilitate use of the block cutting guide 11 as a measuring device. Unlike the first set 31 of indicia, the second series 34 of such markings are located to indicate successive distances from an end of the board guide member 14. Use of the block cutting guide 11 for such purposes, which will hereinafter be described in more detail, is further facilitated if the saw guide member 16 is also provided with one or more additional sets 36 of indicia that indicate successive distances from an end of the member. Preferably such sets 36 of such indicia are provided on both of the two orthogonal inside surfaces of the angle member 16 to enable easy viewing of the markings when the block cutting guide 11 is held in either a horizontal or a vertical orientation.

During a cutting operation, the operator uses one hand to hold and travel the saw 21 and the other hand to hold the block cutting guide 11 in position against the board end portion 12. In particular, the operator grips the board guide member 14 with the other hand and pulls the member 14 towards the board 13 while also exerting some downward pressure. It is advantageous if the block cutting guide 11 is provided with means 37 for defining a predetermined location along the board guide member 14 at which the member is to be gripped by the operators hand, the location being spaced from saw contacting surface 22 a distance sufficient to situate the operators hand away from the saw 21. Such means 37 in this example is a hook shaped thumb grip 38 secured to the board guide member 14 and which extends upward and over the adjacent region of board portion 12 when the member 14 is positioned as previously described.

Referring to FIG. 6, the thumb grip 38 is shaped and proportioned to be received between the thumb and forefinger of the hand while the forefinger and other fingers extend over, behind and under the upper portion of the board guide member 14 in order to grip the member. This prevents inadvertent movement of the hand along the guide member 14 in the direction of the saw 21.

During use, the cutting element 24 of saw 21 is preferably adjusted to cut to a depth just equal to the thickness of the boards 13 which are to be sawed into segments of predetermined length. The board 13 may then simply be laid on any suitable support and the cutting operation may then proceed as hereinbefore described. It is not necessary that the lengthy board 13 be repositioned after each cutting operation in order to proceed with the following cutting operation. The block cuting guide 11 and hand held saw 21 may simply be repositioned at the newly formed end of the board 13 following removal of each cut block 12. If a series of the boards 13 are initially stacked on top of each other, the entire stack may be cut into blocks without further handling of the boards as the cutting and removing of blocks from the uppermost board exposes the next underlying board.

Referring now to FIGS. 1 and 7 in conjunction, the series 34 and 36 of dimensional indicia can facilitate the setting of stop member 23 to cut blocks of a particular require length. If, for example, blocks are to be cut for installation between spaced apart joists 39, the saw contacting surface 22 may be abutted against one joist and exact spacing of the joists may then be read from the indicia series 34. Placing of the stop member 23 at the corresponding location on the offset series 31 of indicia will then provide blocks which will precisely span the space between the joists 39. The presence of the additional series 36 of dimensional measurement indicia on the saw guide member 16 further facilitates such measurements under certain conditions. As illustrated in FIG. 8, this makes it possible to grasp the block cutting guide 11 at the end of the board guide member 14, which is typically longer than the saw guide member 16, in order to easily measure the gap between overhead building frame members 41.

The block cutting guide 11 can also be used for purposes other than the repetitive cutting of blocks having a predetermined length fixed by the setting of the stop member 23. If the stop member 23 is removed, the block cutting guide may than be used to make precisely right angled cuts across boards 13 at locations which are simply selected by the operator or which are identified by penciled lines or the like.

The guide members 14 and 16 of this embodiment are oriented at right angles to each other as most usages involve the making of right angled cuts across boards 13. The block cutting guide may also be formed to have members 14 and 16 which are differently angled with respect to each other for use in cutting non-rectangular blocks or the two members can be made to be pivotable with respect to each other if clamping means are provided for locking the members at some selected angling.

While the invention has been disclosed with respect to a single preferred embodiment, many variations and modifications of the construction are possible within the scope of the invention and it is not intended to limit the invention except as defined in the following claims.

We claim:

1. A block cutting guide for facilitating the saving of a board of lumber into segments of predetermined length with a hand held saw, comprising:

a board guide member having a first flat vertical surface for abutment against the side surface of said board that is opposite from an operator of the saw, said board guide member having a vertically extending first potion that defines said first flat surface and a horizontally extending second portion that extends outward from said side surface of said board when said first portion is abutted thereagainst, said second portion being thinner than said first portion in the vertical direction and being sufficiently extensive in the outward direction to enable the fingers of one of the operator's hands to be curled around and under said second portion to grip said board guide member without contact of said fingers with the board, a saw guide member secured to said board guide member in angled relationship thereto and having a second flat surface against which a saw may be abutted for travel therealong, the second surface being positioned to extend across said board when said first surface is abutted against said side thereof, a stop member extending outward from said first surface in a position for abutment against an end of said board when said first surface is abutted against said side thereof and means for defining a predetermined location along said board guide member at which said board guide member is to be gripped by the fingers of the operator's hand and for inhibiting inadvertent movement of said operator's hand towards said saw guide member, said location being spaced apart from said saw guide member by a distance sufficient to hold said operator's hand away from said second surface, wherein said means includes an element which extends upward from said board guide member and which is positioned to be received between the thumb and forefinger of said operator's hand.

2. The apparatus of claim 1 further including means for selectively changing the location of said stop member along said first surface and wherein said board guide member has a first set of indicia thereon which are indicative of predetermined distances from the location of the cutting blade of said saw when said saw is abutted against said second surface and has a second set of indicia which are indicative of successive distances from an end of said board guide member.

3. The apparatus of claim 2 wherein said saw guide member has spaced apart indicia thereon which identify successive distances from one end of said saw guide member.

4. The apparatus of claim 1 wherein said stop member is a clamp having an open-ended slot in which an edge portion of said board guide member is received and having a threaded bore extending outward from said slot, further including a threaded screw engaged in said bore for clamping said stop member at any of a plurality of different locations along the length of said board guide member.

5. The apparatus of claim 1 wherein said element of said means for defining a predetermined location along said board guide member is a hook-like element extending from said board guide member at said location and being proportioned to be received between the thumb and forefinger of said operator's hand.

6. A block cutting guide for facilitating the sawing of a board of lumber into segments of predetermined length, comprising:
- a board guide member having a first flat surface for abutment against a side surface of the board wherein said board guide member is an angle member having a first rectangular portion defining said first surface and a second rectangular portion which extends from an edge of said first rectangular portion at right angles thereto and which extends outward from said board when said first surface is abutted against said board,
- a saw guide member secured to said board guide member in angled relationship thereto and having a second flat surface against which said saw may be abutted for travel therealong, the second surface being positioned to extend across said board when said first surface is abutted against said side thereof, and wherein said saw guide member is also an angle member having a first rectangular portion defining said second surface and a second rectangular portion extending from an edge thereof at right angles thereto, said second rectangular portions of said board guide member and said saw guide member being in contacting parallel relationship at adjoining ends thereof and being secured together at said adjoining ends,
- a stop member extending outward from said first surface in position for abutment against an end of said board when said first surface is abutted against said side thereof, and
- means for defining a predetermined location along said board guide member at which said board guide member is to be gripped by the forefinger of an operator's hand and for inhibiting inadvertent movement of said operator's hand towards said saw guide member, said location being spaced apart from said saw guide member by a distance sufficient to hold said operator's hand away from said second surface.

7. A block cutting guide for facilitating the sawing of a board into segments of predetermined length, said board having sides and a relatively broad face extending therebetween across which a saw is to be traveled, comprising:
- a board guide angle member having a flat board contacting surface for disposition against a side of said board,
- a saw guide angle member extending from one end of said board guide angle member at right angles thereto and being secured thereto in the region of said one end, said saw guide angle member having a flat saw contacting surface oriented at right angles to both said board contacting surface and said face of the board when the board contacting surface is abutted against said side of said board,
- a stop member engaged on said board guide angle member and extending from said board contacting surface thereof in a position to abut an end of said board while said board contacting surface abuts said side of said board, said stop member being slidable along said board guide angle member to any selected one of a plurality of locations therealong,
- means for selectively clamping said stop member to said board guide angle member at any selected one of said locations, and
- a hook shaped element secured to said board guide angle member and extending therefrom in position to be received between the thumb and forefinger of an operator's hand which concurrently grips said board guide angle member during use of said apparatus, said hook shaped element being spaced apart from said saw guide angle member and being located to position said operator's hand away from said saw contacting surface.

* * * * *